United States Patent [19]

Soda et al.

[11] Patent Number: 5,313,342

[45] Date of Patent: May 17, 1994

[54] ANALOG/DIGITAL COMPATIBLE REPRODUCING SYSTEM

[75] Inventors: Yutaka Soda; Keisuke Fujiwara; Hiroaki Yada; Satoru Seko; Munekatsu Fukuyama; Tetsuo Sekiya, all of Kanagawa, Japan

[73] Assignee: Sony Corporation, Tokyo, Japan

[21] Appl. No.: 979,483

[22] Filed: Nov. 20, 1992

Related U.S. Application Data

[63] Continuation of Ser. No. 619,522, Nov. 29, 1990, abandoned.

[30] Foreign Application Priority Data

Nov. 29, 1989 [JP] Japan ................... 1-310449
Nov. 29, 1989 [JP] Japan ................... 1-310451

[51] Int. Cl.$^5$ ...................... G11B 15/12; G11B 5/265
[52] U.S. Cl. ........................................ 360/63; 360/121
[58] Field of Search ................. 360/61, 63, 66, 26, 360/32, 121

[56] References Cited

U.S. PATENT DOCUMENTS

| 4,259,703 | 3/1981 | Young et al. | 360/66 |
| 4,309,729 | 1/1982 | Kice | 360/63 |
| 4,525,755 | 6/1985 | Meek | 360/63 |
| 4,533,964 | 8/1985 | Owaki et al. | 360/26 |
| 4,616,272 | 10/1986 | Moriyama | 360/63 |

FOREIGN PATENT DOCUMENTS 0312106 4/1989 European Pat. Off. ..... G11B 15/07
381266 8/1990 European Pat. Off. .

Primary Examiner—Donald Hajec
Assistant Examiner—Won Tae C. Kim
Attorney, Agent, or Firm—Hill, Steadman & Simpson

[57] ABSTRACT

An analog/digital compatible reproducing system is disclosed, particularly a stationary head system using a digital recorded magnetic tape having a plurality of n, digital data recorded tracks. An analog recorded magnetic tape has a first analog recorded track and a second analog recorded track between which a guardband of a certain width is provided. Signals are reproduced from the digital recorded magnetic tape by driving n reproducing magnetic head elements respectively corresponding to the n digital data recorded tracks. The analog recorded magnetic tape is reproduced by driving a plurality of m reproducing magnetic head elements of said n reproducing, magnetic head elements, corresponding to the first and second recorded tracks so that common outputs can be produced from the m reproducing magnetic head elements. There is also disclosed a tape cassette used in such system.

12 Claims, 14 Drawing Sheets

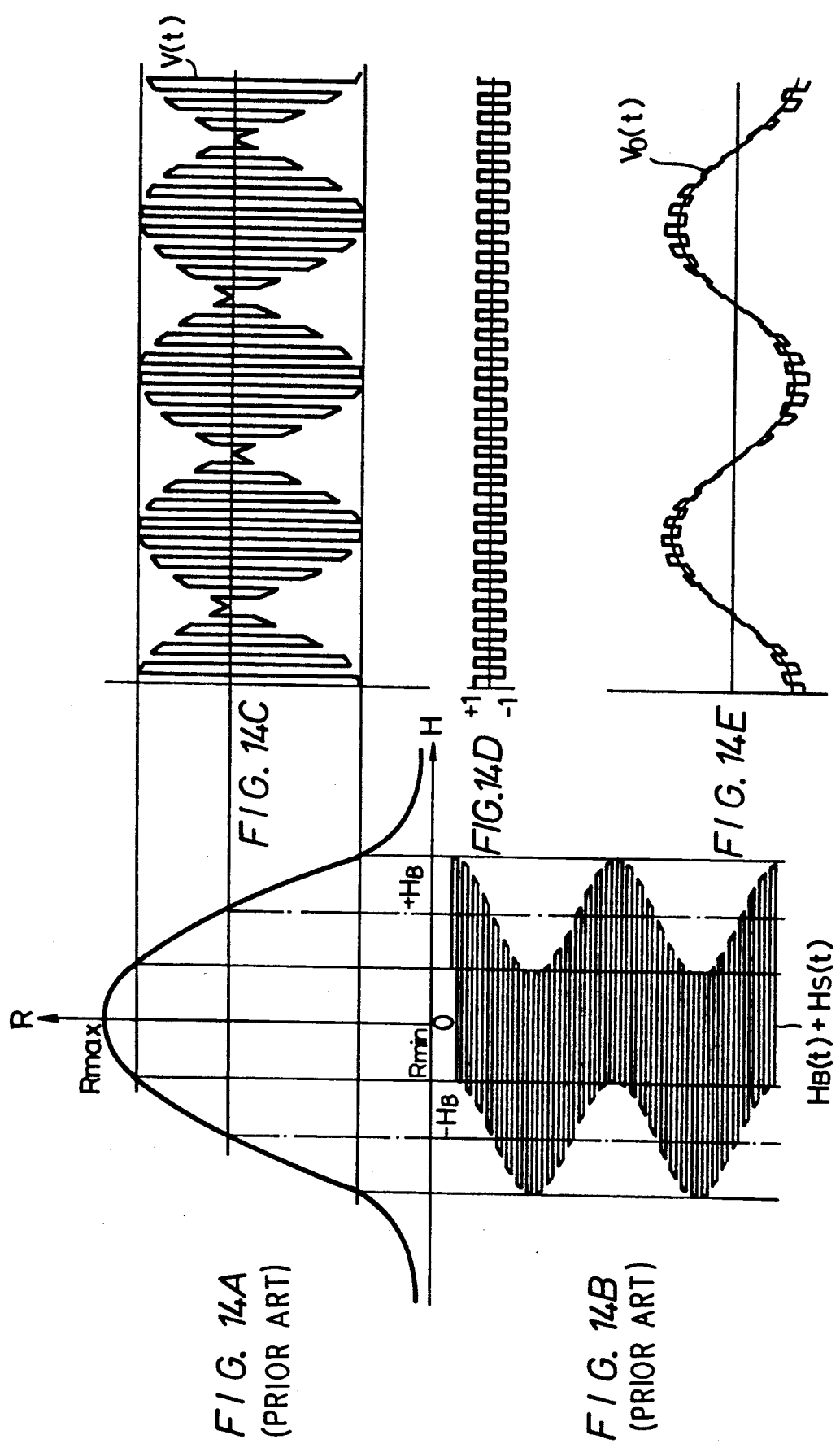

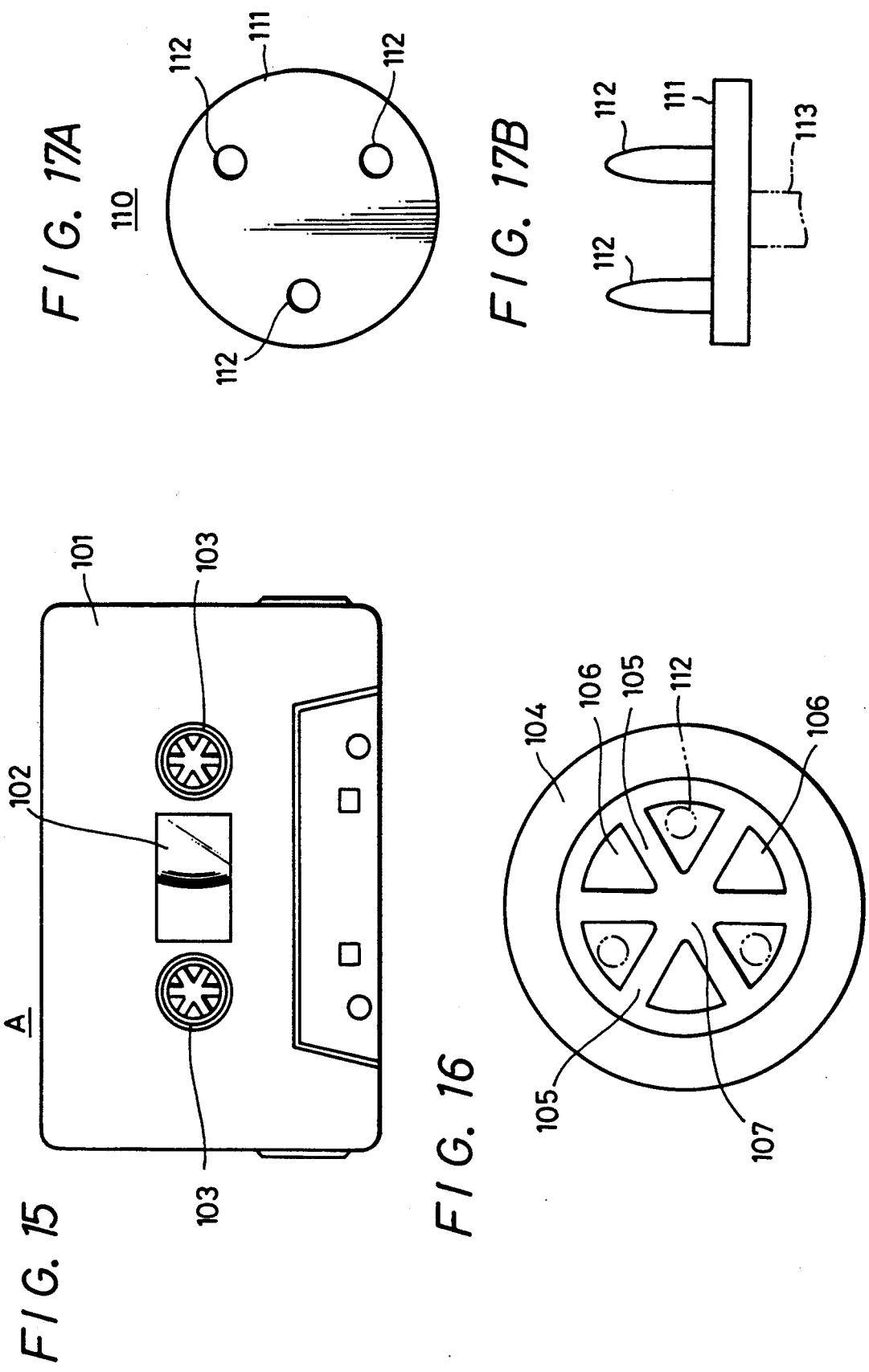

ANALOG/DIGITAL COMPATIBLE REPRODUCING SYSTEM

This is a continuation of application Ser. No. 619,522, filed Nov. 29, 1990, abandoned.

BACKGROUND OF THE INVENTION

This invention relates to an analog/digital compatible reproducing system applied particularly to a digital audio tape recorder of a stationary head system (S-DAT) for reproduction or recording/reproduction, so as to be capable of reproducing a normally analog recorded tape, for example, the compact cassette tape, and a tape cassette usable in such a system.

Recently, the digital recording audio tape recorder DAT has achieved remarkable development and popularization. However, since the usual cassette tape, or compact cassette audio tape is in extremely widespread use, the general users have a large number of recorded compact cassette tapes and thus use a conventional analog tape recorder and DAT. This causes great inconvenience, particularly for the user of the portable tape recorder of a pocket-size or the like.

An S-DAT (stationary head digital audio tape recorder) has substantially the same construction or hardware as does the conventional analog cassette system (player and recorder) except it has a multitrack head and is able to reproduce the analog signal recorded on the conventional compact cassette or record an analog signal on the compact cassette, and can further record and reproduce a digital signal, or is constructed to have the compatibility for both digital and analog recording/reproduction.

In this case, the cassette tape exclusively used for the S-DAT is produced according to the same specification as the conventional compact cassette B shown in FIG. 20 which is exclusively used for analog recording as will be understood from the above description. Therefore, particularly a reel hub 122 shown in FIG. 21, around which a magnetic tape 121 is wound has 6 ratchets 124 provided at an equal pitch on the inner wall of a cylindrical body 123 so as to project towards its center in the same way as in the conventional compact cassette B. A reel table 125 provided in the tape cassette holding portion of the S-DAT is matched with the shape of the reel hub 122. As shown in FIG. 22, this reel table has a reel shaft 126 at its center and this reel shaft 126 has 3 engaging projections 127 integrally provided around the reel shaft 126 at an equal pitch, as in the conventional analog cassette system. The three engaging projections 127 are inserted in recesses 128 which are formed between the ratchets 124 of the reel hub 122, when a tape cassette exclusively used for the S-DAT is loaded in the tape cassette holding portion of the S-DAT, or when the reel hub 122 is fitted on the reel table 125. When the reel table 125 is rotated in one direction as a rotating shaft 129 rotates, the reel hub 122 is rotated while the engaging projections 127 of the reel table 125 engage with the ratchets 124 of the reel hub 122. Thus, when this reel hub 122 ratchets, the magnetic tape 121 is wound on the other reel hub 122, and is transported past the head so that, for example, analog and digital reproduction is automatically made. Since the specification of the S-DAT tape cassette is the same as that of the conventional compact cassette B, the tape cassette for S-DAT has a mark (for example, detection hole or the like) provided for mechanically or electrically distinguishing from the conventional compact cassette.

The tape cassette exclusively used for S-DAT which has been discussed can be loaded in the normal analog cassette system since it has the same specification as the conventional compact cassette B. When the S-DAT tape cassette is recorded with a digital signal, however, the digital signal cannot be reproduced by the normal analog cassette system. This, the general user will inevitably load the S-DAT tape cassette in the normal analog cassette system without knowing it. Thus, in order to distinguish the S-DAT tape cassette from the conventional tape cassette, the general user will have to put an identification mark on the label, and finally will have no choice but to try to load the tape cassette in the analog cassette system and to reproduce it, thus probably getting confused in using tape cassettes. Moreover, since the idea of the compatibility for the digital and analog recording/reproduction is not yet fully understood by the general user, the S-DAT tape cassette may be mistaken for the compact cassette. In that case, since the S-DAT can not be reproduced, it may be regarded as being defective.

OBJECTS AND SUMMARY OF THE INVENTION

In view of the above aspect, this invention is to provide an analog/digital compatible reproducing system capable of at least reproducing both analog recorded tape and digital recorded tape on a single tape recorder with the compatibility for both tapes.

Further with this invention, a tape cassette is to be provided which is capable of preventing confusion in use of the S-DAT tape cassette such that a general user can easily understand the compatibility for the digital and analog recording/reproduction.

This invention proposes an analog/digital compatible reproducing system, particularly a stationary head system using a digital recorded magnetic tape having a plurality of n digital data recorded tracks, and an analog recorded magnetic tape having a first analog recorded track and a second analog recorded track between which a guardband of a certain width is provided, so as to reproduce signals from the digital recorded magnetic tape by driving n reproducing magnetic head elements respectively corresponding to the n digital data recorded tracks, and to reproduce the analog recorded magnetic tape by driving a plurality of m reproducing magnetic head elements of the n reproducing magnetic head elements corresponding to the first and second recorded tracks so that common outputs can be produced from the m reproducing magnetic head elements.

This invention also proposes an analog/digital compatible reproducing system according to the above system wherein the reproducing magnetic head elements are formed of magnetoresistance effect reproducing magnetic head elements having magnetoresistance effect magnetosensitive portions. This system further comprises switching means for applying a high-frequency bias magnetic field to the magnetoresistance effect magnetosensitive portions when reproduction is made on the analog recorded magnetic tape by the magnetic head elements and for applying a DC bias magnetic field to the magnetoresistance effect magnetosensitive portions when reproduction is made on the digital recorded magnetic tape.

Moreover, this invention proposes an analog/digital compatible reproducing system using an analog recorded magnetic tape and a digital recorded magnetic tape each of which is divided into one half and the other half in the widthwise direction, and is transported in one direction and in the other direction so that each of the halves can be reproduced. Upon transport in the one direction, a recorded area is included on one half of the analog recorded magnetic tape and on the other half of the digital recorded magnetic tape, while upon transport in the other direction a recorded area is included on the other half of the analog recorded magnetic tape and on the one half of the digital recorded magnetic tape.

Also, this invention proposes an analog/digital compatible reproducing system using an analog magnetic tape and a digital magnetic tape each of which is divided into one half and the other half in the widthwise direction, and is transported in one direction and the other direction so as to be reproduced. An analog recorded area and a digital recorded area are reproduced by a digital reproducing magnetic head which comprises an analog reproducing magnetic head disposed to oppose each of the halves elements disposed to oppose a plurality of digital data tracks.

Thus, a single apparatus can reproduce the normal analog recorded magnetic tape and the digital recorded magnetic tape.

Further, there is provided a tape cassette comprising reel hubs 103 each having cutouts 106 provided to oppose engaging projections 127 of a normal reel table 125, or a reel table that has provided at its center a reel shaft 126 around which engaging projections 127 are integrally provided and blocking portions 105 and 107 provided to block the reel shaft 126 from being inserted in the reel hub.

According to the construction of this invention, since the cutouts 106 are provided at the positions corresponding to the engaging projections 127 which are provided around the reel shaft 126 of the normal reel table 125 and the blocking portions 105 and 107 are provided to block the reel shaft 126 not to be inserted, this cassette can be prevented from being loaded to the reel table 126 of the normal analog cassette system. Thus, the general user can easily understand that the tape cassette for a recorder having compatibility for the digital and analog recording/reproduction (for example, S-DAT) cannot be used on the normal analog cassette system. Thus, there is no confusion upon using the tape cassette. Moreover, the general user can understand the idea of the compatibility, or that the S-DAT or the like has the compatibility for the digital and analog recording/reproduction, whereas the normal analog cassette system does not have the compatibility for the digital recording/reproduction.

BRIEF DESCRIPTION OF THE DRAWINGS

FIG. 14 is a waveform diagram useful for the explanation of the prior art head element thereof;

FIG. 15 is a plan view of a tape cassette of this embodiments;

FIG. 16 is a plan view of the structure of the reel hub of this embodiment;

FIGS. 17A and 17B are a plan view and a side view of the reel table concerned with this embodiment;

DESCRIPTION OF THE PREFERRED EMBODIMENTS

This invention employs the stationary head tape DAT, or S-DAT (stationary head digital audio tape recorder), and the digital recorded magnetic tape takes the same format as, for example, the analog recorded magnetic tape, or the compact cassette format.

Figure 1:
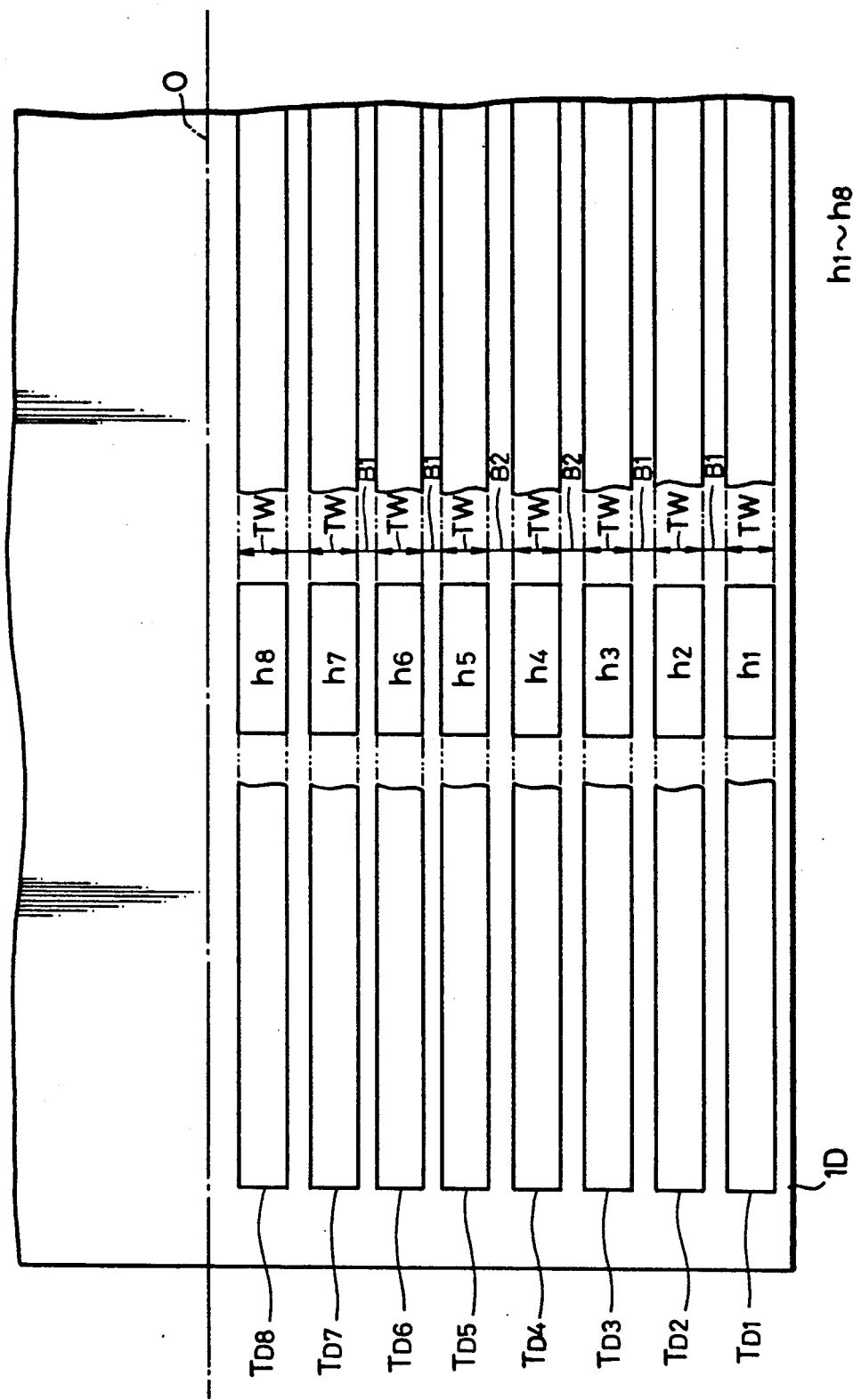
FIGS. 1 and 2 show the relationships between the tracks and the head elements of one embodiment of a system of the invention.
Figure 2:
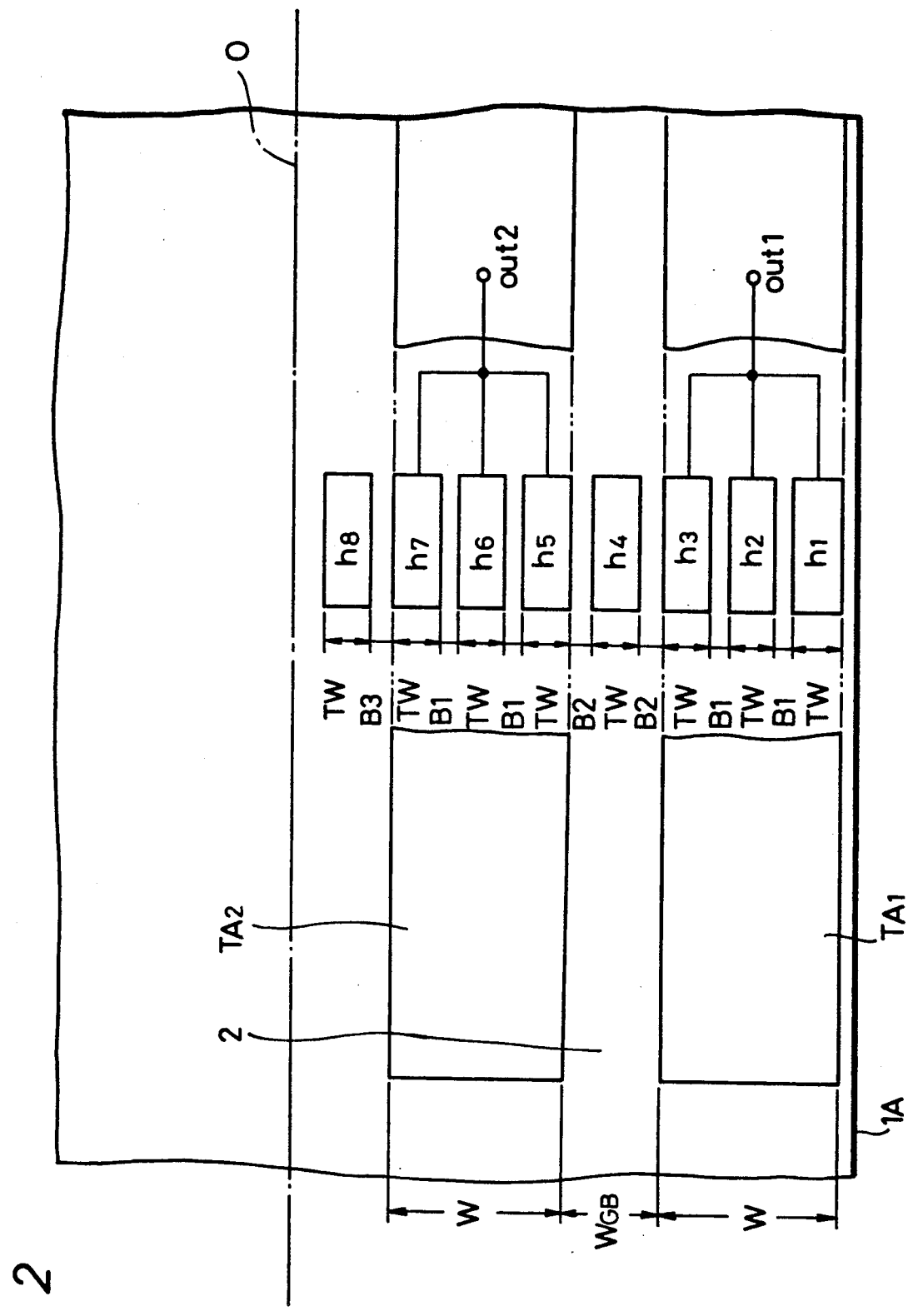

According to this invention there is provided as a positional relationship between the magnetic tape and magnetic head element is schematically shown in FIGS. 1 and 2, an analog/digital compatible reproducing system using a digital recorded magnetic tape ID (see FIG. 1) having a plurality of n digital data recorded tracks $T_{D1}$, $T_{D2}$, $T_{D3}$... and an analog recorded magnetic tape 1A having a first analog recorded track $TA_1$ and a second analog recorded track $TA_2$ between which a guardband 2 of a certain width $W_{GB}$ is provided. Signals from the digital recorded magnetic tape 1D are reproduced by driving n reproduction magnetic head elements $h_1$, $h_2$, $h_3$... respectively opposite to the n digital data recorded tracks $T_{D1}$, $T_{D2}$, $T_{D3}$ . . .. The analog recorded magnetic tape 1A is reproduced by driving a plurality of m reproducing magnetic head elements of the n reproducing magnetic head elements of the n reproducing magnetic head elements $h_1$, $h_2$, $h_3$... opposite to the first and second recorded tracks so that common outputs can be produced from the m reproducing magnetic head elements.

Figure 3:
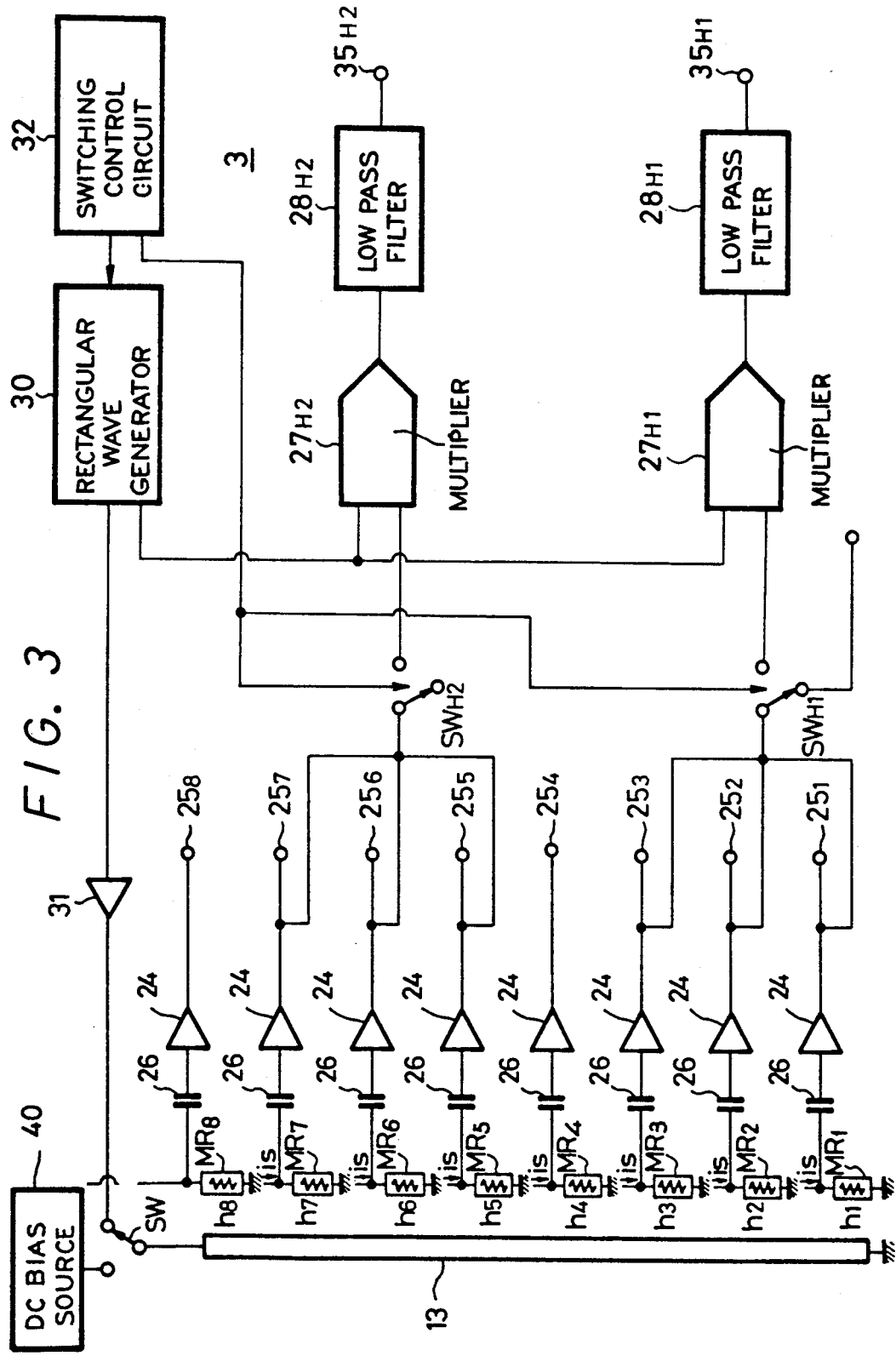
FIGS. 3, 9 and 10 are circuit diagrams of embodiments of a system of this invention.

According to this invention, there is also provided an analog/digital compatible reproducing system according to the above system as shown in FIG. 3 by the circuit example wherein the reproducing magnetic head elements $h_1$, $h_2$ $h_3$... are formed of magnetoresistance effect reproducing magnetic head elements having magnetoresistance effect magnetosensitive portions $MR_1$, $MR_2$, $MR_3$.... In this case the system further comprises switching means 3 for applying a high frequency bias magnetic field to the magnetoresistance effect magnetosensitive portions MR1, MR2, MR3 .... Reproduction is made on the analog recorded magnetic tape 1A by the magnetic head elements $h_1$, $h_2$, $h_3$.... A DC bias magnetic field is applied to the magnetoresistance effect magnetosensitive portions $MR_1$, $MR_2$, $MR_3$ when reproduction is made on the analog recorded magnetic tape 1A by the magnetic head elements $h_1$, $h_2$, $h_3$ . . .. A DC bias magnetic field is applied to the magnetoresistance effect magnetosensitive portions $MR_1$, $MR_2$, $MR_3$ . . . when reproduction is made on the digital recorded magnetic tape 1D.

Figure 4A:
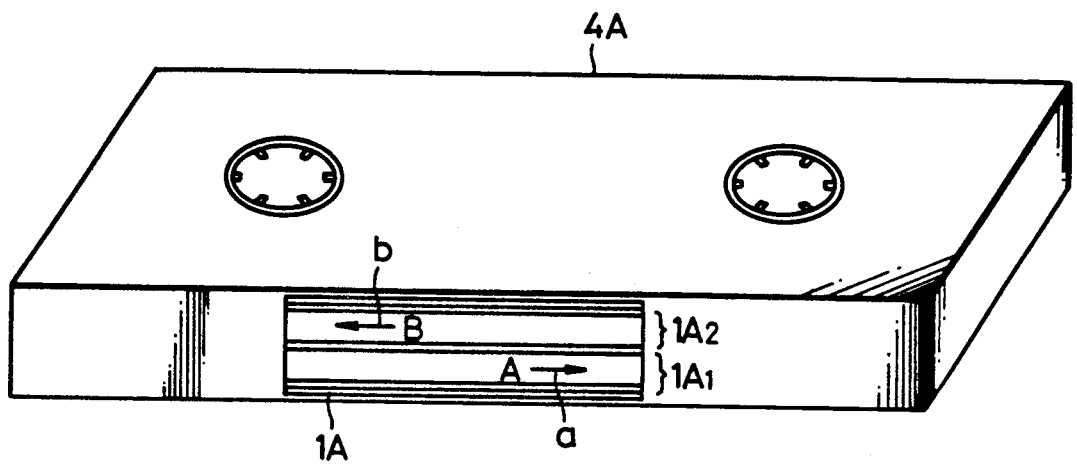
FIGS. 4A and 4B are perspective views of magnetic tape cassettes.
Figure 4B:
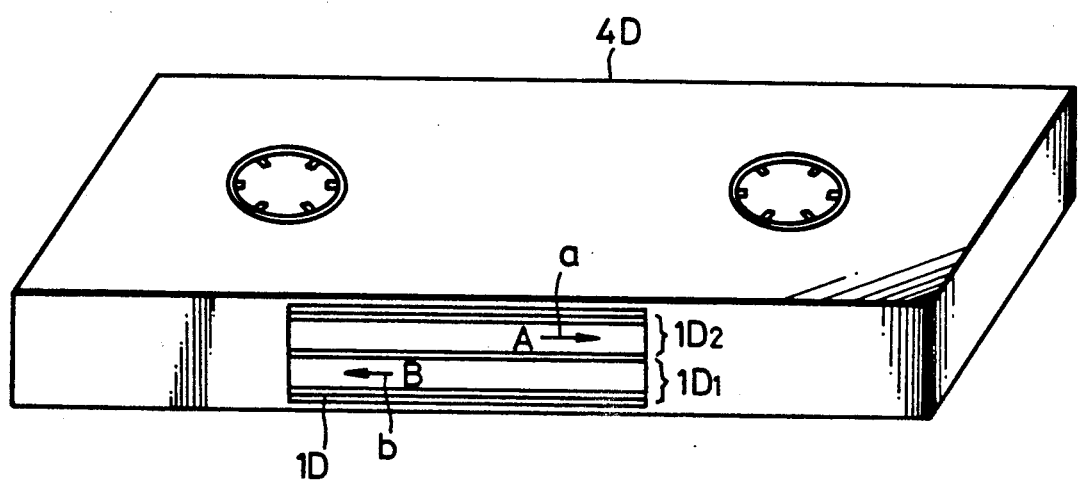

According to the invention, the following is provided. FIG. 4A is a perspective view of the analog recorded magnetic tape 1A and tape cassette 4A, and FIG. 4B shows the tape cassette 4D for the digital recorded magnetic tape 1D. There is also provided an analog/digital compatible reproducing system using the analog recorded magnetic tape 1D which is divided into one half $1A_1$, $1D_1$, and the other half $1A_2$, $1D_2$ in the widthwise direction, and which is transported in one direction indicated by arrow a and in the other direction indicated by arrow b so that each of the halves can be reproduced. Upon transport in the one direction a, recorded area of the so-called A-side is included on one half $1A_1$ of the analog recorded magnetic tape and on the other half $1A_2$ of the digital recorded magnetic tape, while upon transport in the other direction b, a recorded area of the so-called B-side is included on the other half $1A_2$ of the analog recorded magnetic tape 1A and on the other half $1D_1$ of the digital recorded magnetic tape 1D.

Figure 5:
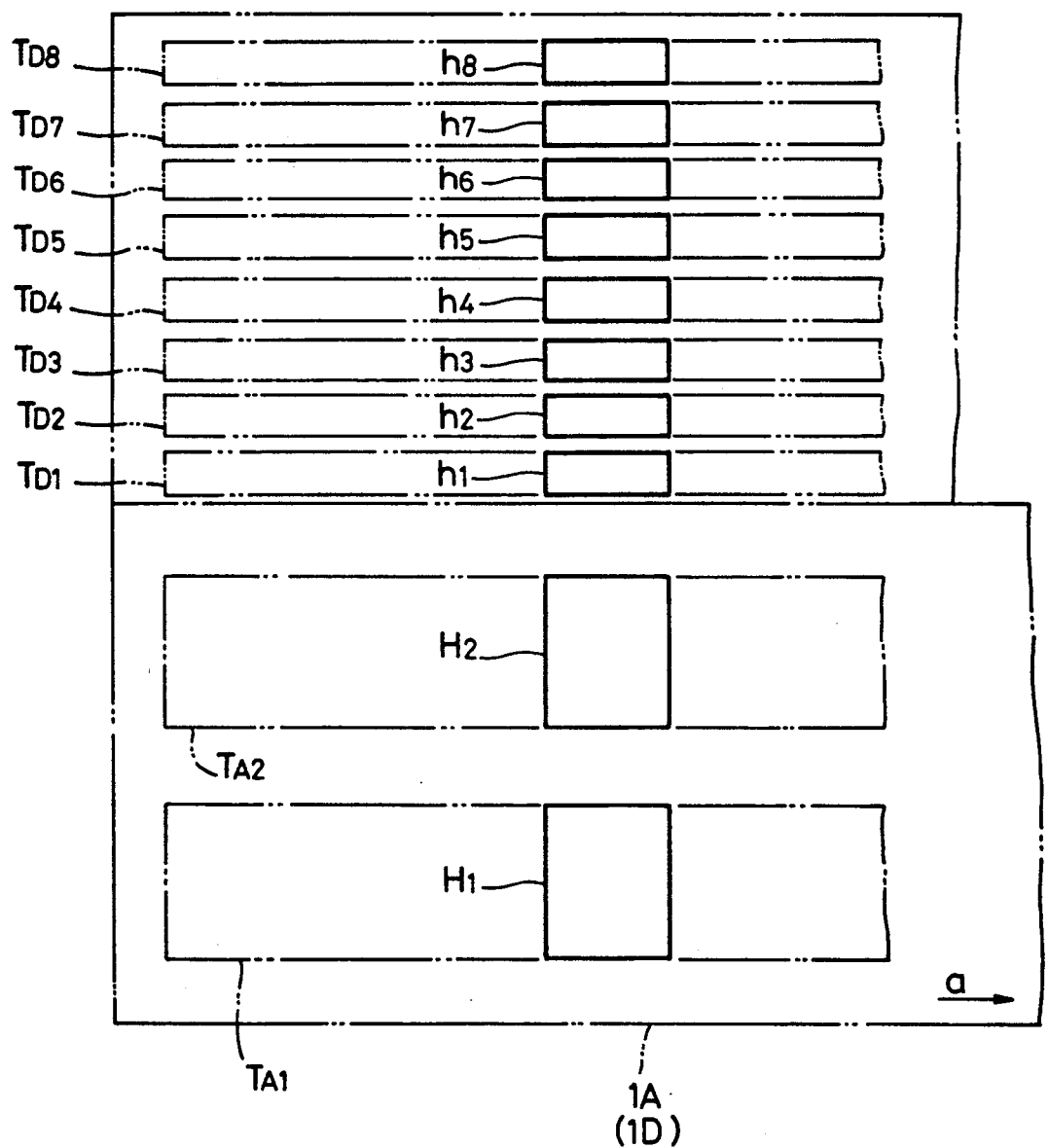
FIG. 5 is a diagram of the arrangement of magnetic head elements.

According to this invention, there is provided as shown in FIGS. 4A and FIG. 4B an analog/digital compatible reproducing system using an analog magnetic tape 1A and a digital magnetic tape 1D, each of which is divided into one half 1A, $1D_1$ and the other half $1A_2$, $1D_2$ in the widthwise direction and which is transported in one direction. As shown in FIG. 5, an analog recorded area and a digital recorded area are reproducing by a digital reproduce magnetic head which comprises analog reproducing magnetic head elements $H_1$ and $H_2$ disposed opposite each of the halves of the magnetic tape 1A, and digital reproducing magnetic head elements $h_1$, $h_2$, $h_3$ . . . disposed opposite a plurality of digital data tracks of tape 1D having opposite halves to those of tape 1A.

According to the system of this invention, a signal apparatus or tape recorder can be used to reproduce not only a digital recorded magnetic tape, but also an analog recorded compact cassette tape which has been widely used so far.

An embodiment of a system of this invention will be described with reference to FIGS. 1 and 2.

As shown in FIG. 1 a plurality of n tracks, in this embodiment 7 digital data recorded tracks $T_{D1}$ $T_{D7}$ and, for example, one signal recorded track $T_{D8}$ are formed on a digital recorded magnetic tape 1D. Magnetic head elements $h_1$ to $h_7$ oppose the tracks $T_{D1}$ to $T_{D7}$, and a magnetic head element $h_8$ are provided. Of the n=7 magnetic head elements h1 to h7, two sets of m, for example, 3, magnetic head elements $h_1$ to $h_3$, $h_5$ to $h_7$ are, as shown in FIG. 2, opposed to, for example, the left- and right-channel signal recorded tracks of an analog recorded magnetic tape 1A, or first and second analog recorded tracks $T_{A1}$ $T_{A2}$. Outputs $out_1$ and $out_2$ are produced from the sets of the elements $h_1$ to $h_3$, $h_5$ to $h_7$ by driving or operating the head elements. In other words, when two sets of three magnetic head elements are respectively opposed to the first and second analog recorded tracks $T_{A1}$ and $T_{A2}$ of the analog recorded magnetic tape 1A of, for example, the normal compact cassette, the three adjacent magnetic head elements $h_1$ to $h_3$ are opposed to the track $T_{A1}$, the next magnetic head element $h_4$ to a guardband 2, and the following three adjacent magnetic head elements $h_5$ to $h_7$ to the other track $T_{A2}$. In this case, since the tracks $T_{A1}$ and $T_{A2}$ on the analog recorded magnetic tape of the normal compact cassette have a width W of 0.61 mm, and the guardband 2 between the tracks $T_{A1}$ and $T_{A2}$ has a width $W_{GB}$ of 0.325 mm, all the magnetic head elements $h_1$ to $h_8$, particularly $h_1$ to $h_7$, can form tracks of an equal, width $T_W$, for example, $T_W=160$ µm, on the tracks $T_{A1}$ and $T_{A2}$. Thus no cross talk is caused therebetween, In addition, the distance $B_1$ between the elements $h_1$ to $h_3$ and between $h_5$ to $h_7$ is selected to be 65 µm, and the distance $B_2$ between the elements $h_4$ within the guardband 2 and the opposed edges of the analog audio tracks is selected to be 82.5 µm.

The magnetic head elements $h_8$ for the cue signal recorded track $T_{D8}$ is opposed to the guardband on the center-0 side of the tape 1D.

These magnetic head elements can also be formed of an inductive type head structure not only for reproduction but also for, for Example, digital recording. Only for reproduction, these head elements can be formed of MR type magnetic head elements which comprise magnetosensitive portions having the magnetoresistance effect.

Figure 6:
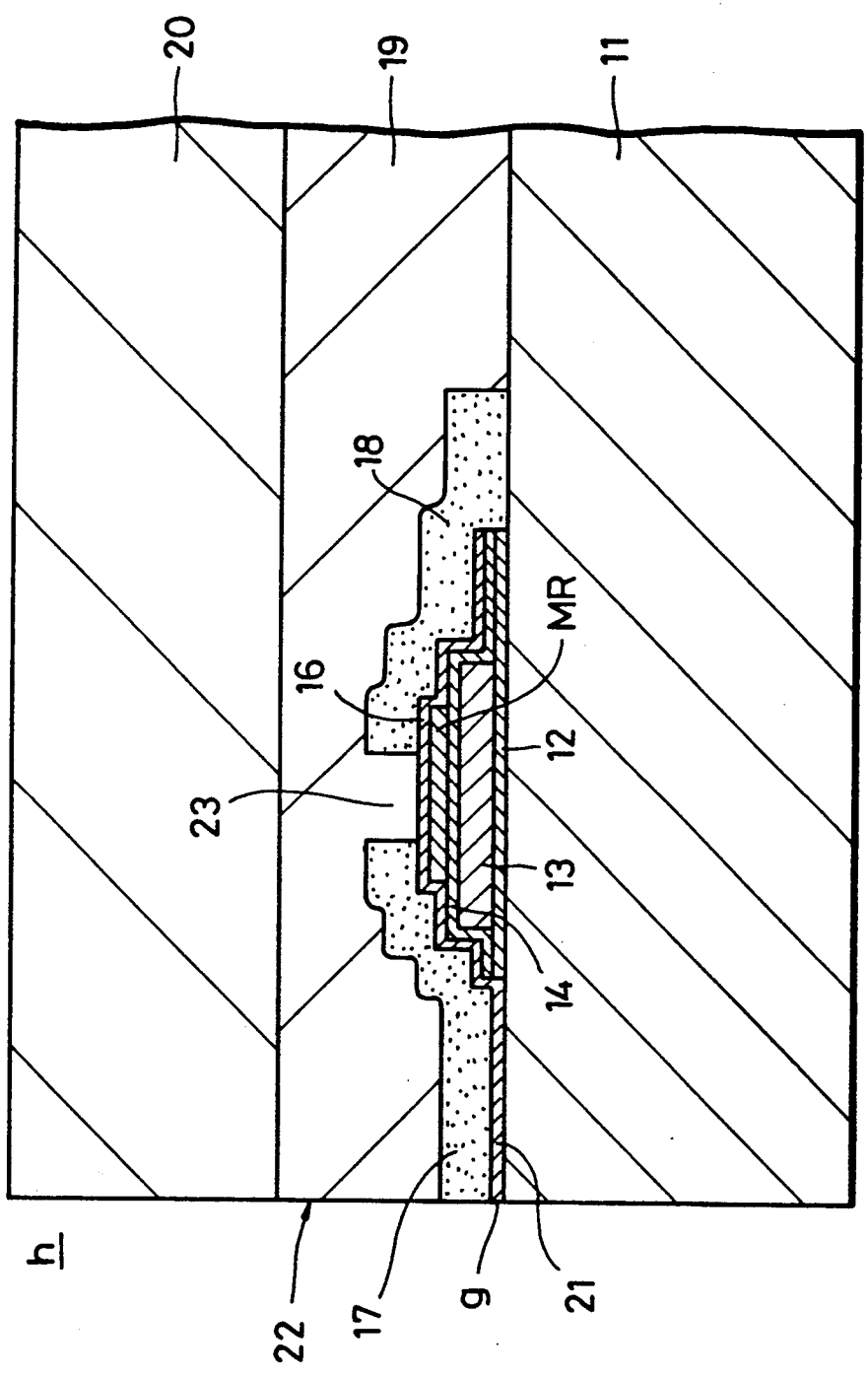
FIG. 6 is a cross sectional diagram of the prior art magnetoresistance effect magnetic head element.

The magnetoresistance effect magnetic head element can be constructed as, for example, shown in FIG. 6, which is a crosssectional diagram of one example thereof. That is, on a magnetic base 11 made of, for example, Ni-Zn based ferrite or Mn-Zn based ferrite (this base 11 being conductive), there is formed through an insulating layer 12 of $SiO_2$ or the like a bias conductor 13 which is formed of a band-shaped conductive film in which a current is to be flowed which produces a bias magnetic field against the magnetoresistance effect magnetosensitive portion which will be described later. On this conductor 13, there is formed through an insulating layer 14 a magnetosensitive portion MR formed of a magnetoresistance effect magnetic thin film made of, for example, a Ni-Fe based alloy or a Ni-Co based alloy. On this magnetosensitive portion MR are formed through a thin insulating layer 16 a pair of magnetic layers 17 and 18 so that the opposite ends of the layers are formed over the top of the magnetosensitive portion and extend across the bias conductor 13 and magnetosensitive portion MR, these magnetic layers being made of, for example, Mo permalloy and serving as magnetic cores of part of the magnetic circuit. To the base 11 is bonded a protective base 20 through a nonmagnetic insulation holding layer 19. A nonmagnetic gap spacer layer 21, which is formed of, for example, an insulating layer 16 and having a necessary thickness, is interposed between the magnetic layer 17 and the front end of the base 11, thus producing a front magnetic gap g. Then, the front end surfaces of the base 11, gap spacer layer 21, magnetic layer 17, protective layer 19 and protective base 20 are ground and polished to form a touching face 22 which is to be made in contact with the magnetic recording medium. The back end of the magnetic layer 17 which makes the magnetic gap g together with the magnetic base and the front end of the other magnetic layer 18 are formed on the insulating layer 16 so as to cross the magnetosensitive portion MR which underlies the insulating layer. However, a discontinuous portion 23 is formed between the opposite ends of the magnetic layers. The back end of the magnetic layer 17 and the front end of the magnetic layer 18 are electrically insulated by the insulating layer 16 on both sides of the magnetoresistance effect magnetosensitive portion MR, but are magnetically coupled. The discontinuous portion 23 between the magnetic layers 17 and 18 is magnetically bridged by the magnetosensitive portion MR, so that a magnetic circuit is formed to make a closed magnetic path of base 11-magnetic gap g-magnetic layer 17-magnetosensitive portion MR-magnetic layer 18-base 11.

The magnetic head elements $h_1$ to $h_8$ of this magnetoresistance effect magnetic head structure are simultaneously formed in parallel on the same base 11 or through a non-magnetic material on the same base 11, and the bias conductor 13 for the elements $h_1$ to $h_8$ is formed in common to the elements $h_1$ to $h_8$.

Figure 7:
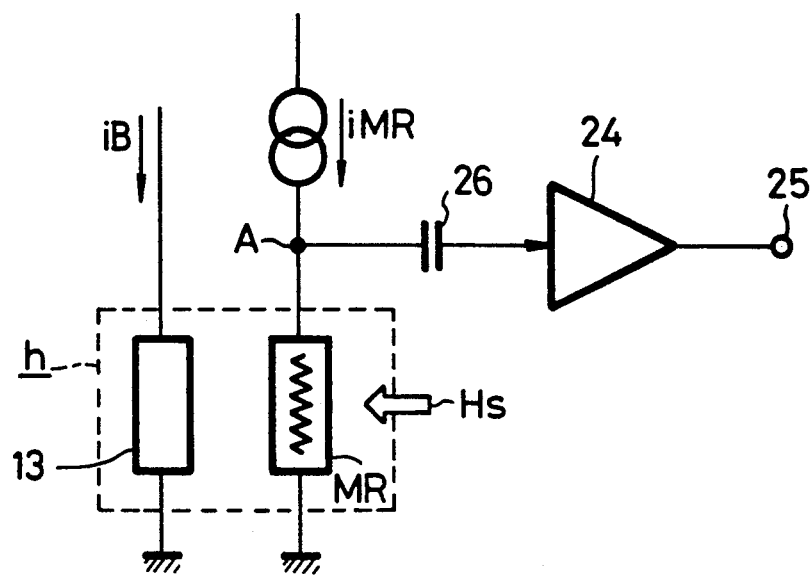
FIG. 7 is a schematic circuit diagram of the prior art head element thereof.

In this magnetoresistance effect magnetic head, the signal magnetic flux from the front gap g made in contact with the magnetic medium is flowed in the magnetic circuit so that the resistance value of the magnetosensitive portion MR in the magnetic circuit is changed by this signal magnetic flux or external magnetic field. Thus, this resistance change is detected as the voltage change across this magnetosensitive portion MR by flowing a detection current in the magnetosensitive portion MR, so that the recorded signal on the magnetic tape can be reproduced. In this case, in order to linearly and highly sensitively operate the magnetosensitive portion MR as a magnetic sensor, it is necessary to magnetically bias the magnetosensitive portion MR. This bias magnetic field includes the magnetic field produced by flowing a current in the bias conductor 13 and the field which the magnetosensitive portion MR itself produced by the detected current therein. In this kind of MR-type magnetic head assembly, as schematically shown in FIG. 7, a magnetic field is applied to the magnetosensitive portion MR by flowing a certain DC current $i_B$ in the bias conductor 13. Under this condition a predetermined detection current $i_{MR}$ is applied with a bias field $H81_B$, or the field is produced by flowing a current in the bias conductor 13 and the magnetic field is produced by flowing the detection current in the magnetosensitive portion MR. Under this condition, the signal magnetic field $H_S$ from the magnetic tape as described above is applied. The voltage across the magnetosensitive portion MR based on the resistance change due to this signal magnetic field $H_S$, creates a change of the potential at point A which is amplified by an amplifier 24, is fed to an output terminal 25, and is detected. Shown at 26 is a low-frequency blocking capacitor.

Figure 8:
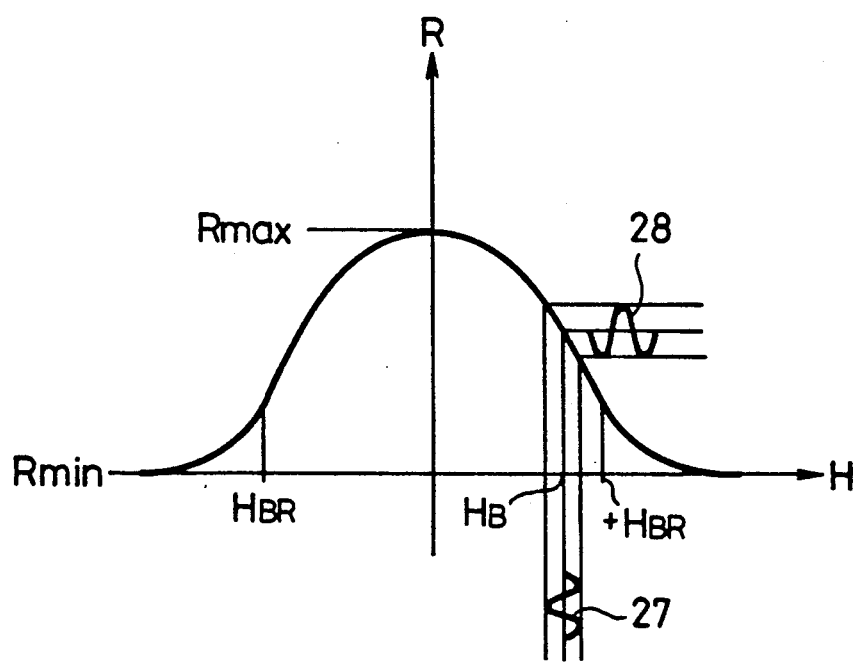
FIG. 8 is a graph of a resistance-magnetic field characteristic curve of the prior art head.

FIG. 8 is a diagram of an operational characteristic curve showing the relationship between the magnetic fields H and resistance value R of this magnetosensitive portion MR. From this figure, it will be seen that in the range $-H_{BR} \sim +H_{BR}$ in which the absolute value of the magnetic field H is small, this curve is a quadratic curve with a maximum, and that as the magnetization of the MR magnetic thin film at its center starts to saturate in the magnetic circuit direction, the resistance R gradually approaches a certain value $R_{Min}$ away from the quadratic curve. In this connection, the maximum value $R_{max}$ of the MR magnetic thin film is all magnetized in the current direction. In the characteristic portion of the quadratic curve of this operational characteristic curve, the bias magnetic field $H_8$ is applied, and under this condition, a signal magnetic field is applied from the magnetic tape as indicated by reference number 67 in FIG. 8. The signal output is obtained by the resistance change shown by reference numeral, 68 in the figure. In this case, however, upon reproduction of the analog signal, or when the signal magnetic field is applied from a recorded analog signal, the second-order harmonic distortion increases the greater the signal field.

Moreover, the potential at point A in the MR-type magnetic head assembly as shown in FIG. 7 is determined by the resultant resistance of the fixed portion and variable portion of the resistance of the magnetoresistance effect magnetosensitive portion. In this case, since the fixed portion is about 98% of the total resistance and has a great temperature dependence, the temperature drift of the potential at point a is large enough to have an adverse effect on the analog reproduction.

Figure 13:
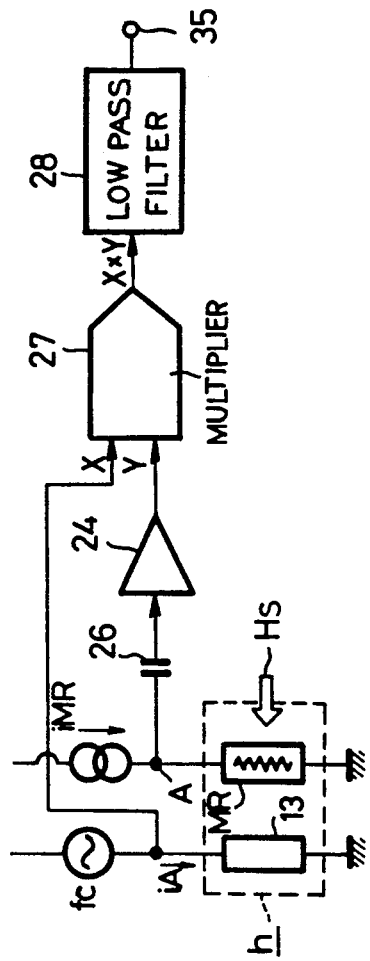
FIG. 13 is a circuit diagram of a conventional prior art magnetoresistance effect magnetic head.

In order to solve the problem with the analog reproduction in the MR magnetic head, a magnetoresistance effect head assembly was proposed as, for example, disclosed in Japanese Patent Laid-open Gazette No. 182503/1985 which was filed by this applicant. This head assembly will be mentioned with the circuit arrangement of FIG. 13. In FIG. 13, like elements corresponding to those in FIG. 7 are identified by the same reference numerals and will not be described.

In this case, an AC bias current $i_A$ of high frequency $f_C$ flows in the bias conductor 13 to produce a high-frequency magnetic field superimposed on a DC magnetic field, an is applied to the magnetosensitive portion MR. The waveform of the AC bias current $i_A$, and hence the waveform of the AC magnetic field, may be a sine wave, rectangular wave or other waveforms.

Thus, since an AC bias magnetic field is superimposed on the DC bias magnetic field and is applied to the magnetosensitive portion MR, an AC signal of frequency fc is produced across the magnetosensitive portion MR, or at point A.

As shown in FIGS. 3 or 13, the AC signal output is supplied through the capacitor 26 and through the preamplifier 24 which passes the component of frequency $f_C$, to a multiplier 27 where this signal X is multiplied by the AC signal Y of frequency $f_C$. Shown at 28 is a low-pass filter.

Thus, the signal output according to the signal magnetic field $H_S$ from the magnetic tape appears at an output terminal 35. If the final output at the output terminal 35 is required to have a band of, for example, 0 to 40 KHz, the frequency $f_c$ of AC current $i_A$ is selected to be triple or above the maximum frequency, or for example $f_c = 140$ KHZ.

FIG. 14A shows a field resistance characteristic curve of the magnetosensitive portion MR. When the magnetosensitive portion MR is applied with the superimposed field of the rectangular wave AC magnetic field $H_B$ (t) and the signal magnetic field $H_S(t)$, the magnetosensitive portion MR produces the output voltage V(t) as shown in FIG. 13C. The multiplier 27 multiplies this output voltage V(t) by the rectangular wave AC current shown in FIG. 13D, and the low-pass filter 28 produces, as shown in FIG. 13E, a signal output $V_0(t)$ corresponding to the signal magnetic field $H_S(t)$ shown in FIG. 13D.

This magnetic head assembly has the advantages of excellent linearity and small distrotion output, small temperature drift, small slide noise, large effective track width, and small track width, and is capable of reducing the capacity of the capacitance, and increasing the dynamic range. Also, in some case, the permeability of the magnetic circuit can be avoided from being reduced.

In this invention, when the magnetic head elements $h_1$ to $h_8$ are formed of MR type magnetic head elements, the reproduction of digital recording can be made substantially without a problem with output linearity, temperature drift and sliding noise, but when part of the magnetic head elements is used for the production of analog recording as described with reference to FIG. 2, the above-given problems occur and thus they are desired to be solved.

Therefore, in this case as shown in FIG. 3, the arrangement shown in FIG. 7, or the arrangement shown in FIG. 13 in which the switching means 3 is provided, is used for the magnetic head elements h, depending on whether the reproduction is made of the digital recorded tape 1A. In FIG. 3, like elements corresponding to those in FIGS. 7 and 13 are identified by the same reference numerals and will not be described. In FIG. 3, SW is the change-over switch for switching a DC bias source 40 and an AC bias to the bias conductor 13. In the illustrated example, a rectangular wave generator 30 for a desired frequency $f_C$ is provided to produce a pulse, which is supplied through an amplifier 31 to the switch SW, by which it is switched and supplied to the common bias conductor 13 as an AC source. In this case, the magnetosensitive portion $MR_1$ to $MR_8$ of the magnetic head elements $h_1$ to $h_8$ are respectively connected through capacitors 26 and amplifiers 24 to output terminals $25_1$ to $25_8$. The output ends of the amplifiers 24 of the respective sets of elements $h_1$ to $h_3$, $h_5$ to $h_7$ are connected to common change-over switches $SW_{H1}$ and $SW_{H2}$ respectively. The change-over switches $SW_{H1}$ and $SW_{H2}$ are connected through multipliers $27H_1$ and $27H_1$ and low-pass filters $28H_1$ and $28H_2$ to output terminals $35H_1$ and $35H_2$, respectively.

The rectangular wave from the rectangular wave generator 30 is supplied to the multipliers $27H_1$ and $27H_2$ where it is multiplied by the output from the change-over switches $SW_{H1}$ and $SW_{H2}$. The multiplied outputs are supplied to the filters $28H_1$ and $28H_2$. Also, in FIG. 3 there is shown an analog/digital switching means 3. In the analog reproduction mode, the switch SW is changed to the AC supply position, and the rectangular wave generator 30 is operated. Also, the change-over switches $SW_{H1}$ and $SW_{H2}$ are changed by the switching control means 32 to the multiplier $27H_1$, $27H_2$ side. Thus, from the output terminals $35H_1$ and $35H_2$ are produced the outputs of the magnetosensitive portions $MR_1$ to $MR_3$, $MR_6$ to $MR_7$ of the magnetic head elements $h_1$ to $h_3$, $H_5$ to $h_7$, as described with reference to FIGS. 13 and 14. In the digital reproduction mode, the switch SW is changed to the DC bias source 40 side position, the rectangular wave generator 30 and so on are stopped from operation, and the change-over switches $SW_{H1}$ and $SW_{H2}$ are opened. Thus, the signals from the magnetic head elements $h_1$ to $h_8$ are produced from the output terminals $25_1$ to $25_8$ as described with reference to FIG. 7.

Figure 9:
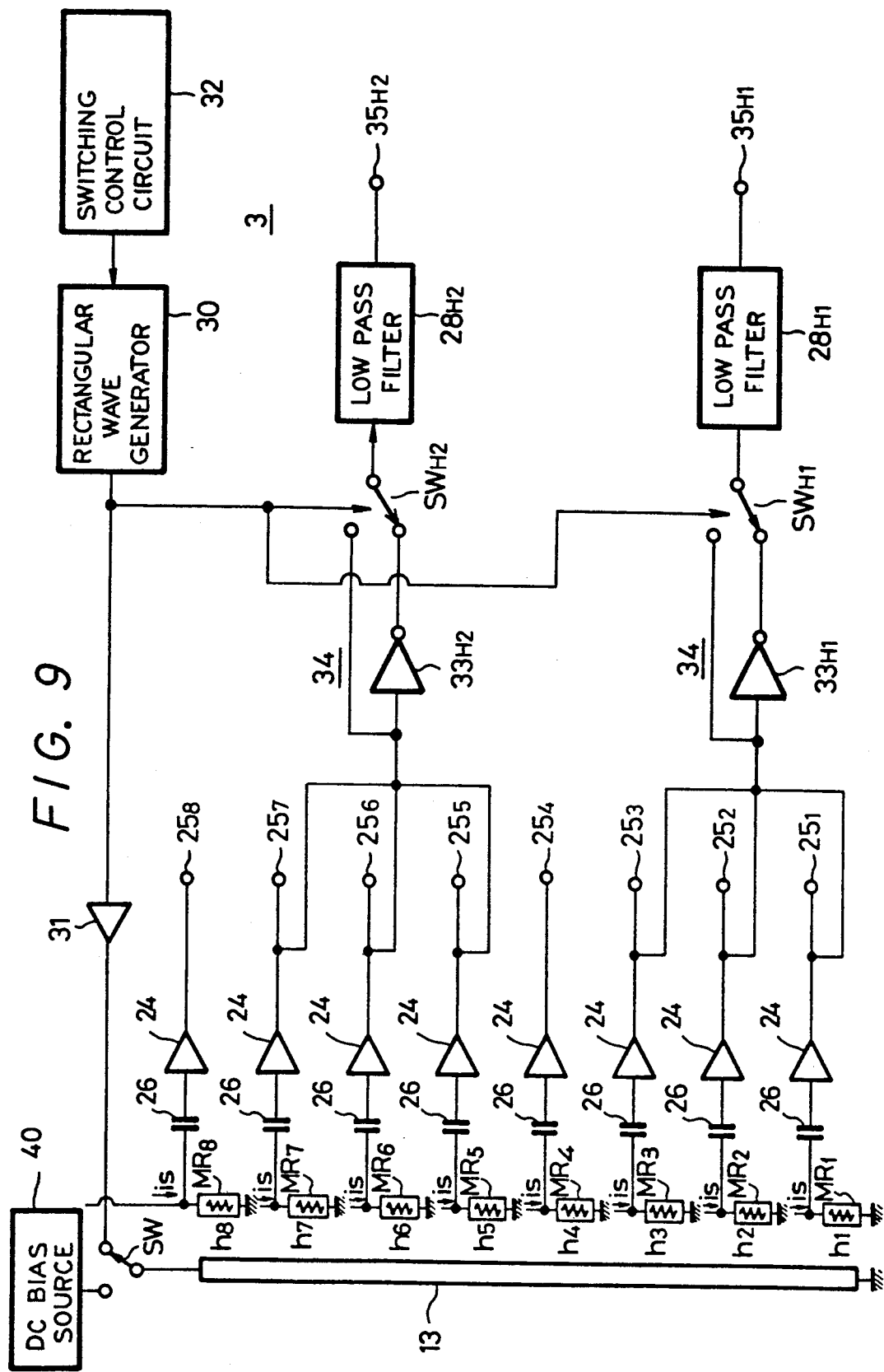

Moreover, similarly another magnetoresistance effect magnetic head assembly is proposed as disclosed in Japanese Patent Laid-open Gazette No. 57012/1986 which this applicant filed. According to this head assembly, the multipliers $27H_1$ and $27H_2$ in FIGS. 13 and 3 are replaced by a phase switching circuit 34 having inverters $33H_1$ and $33H_2$ as shown in FIG. 9. In FIG. 9, like elements corresponding to those in FIG. 3 are identified by the same reference numerals and will not be described. In this case, the switching control circuit 32 for switching the analog reproduction mode and digital reproduction mode, upon digital reproduction, controls the switch SW to be changed to the DC power supply 40 side position, and the rectangular wave generator 30 is stopped from operation. Thus, the outputs from the elements $h_1$ to $h_8$ are produced at the output terminals $25_1$ to $25_8$. In the analog reproduction mode, the switch SW is changed to the amplifier 31 side position, the rectangular wave generator 30 is operated, and the phase switching circuit 34 is operated. In other words, the output from the amplifier 24 and the inverted output from the inverter 33 to which the output of the amplifier is applied are switched and supplied to the low-pass filters $28H_1$ and $28H_2$ by the switches $SWH_1$ S and $SWH_2$ which are controlled by the rectangular wave signal. Thus, the signal outputs according to the signal magnetic field $H_S$ are produced from the output terminals $35H_1$ and $35H_2$.

Figure 10:
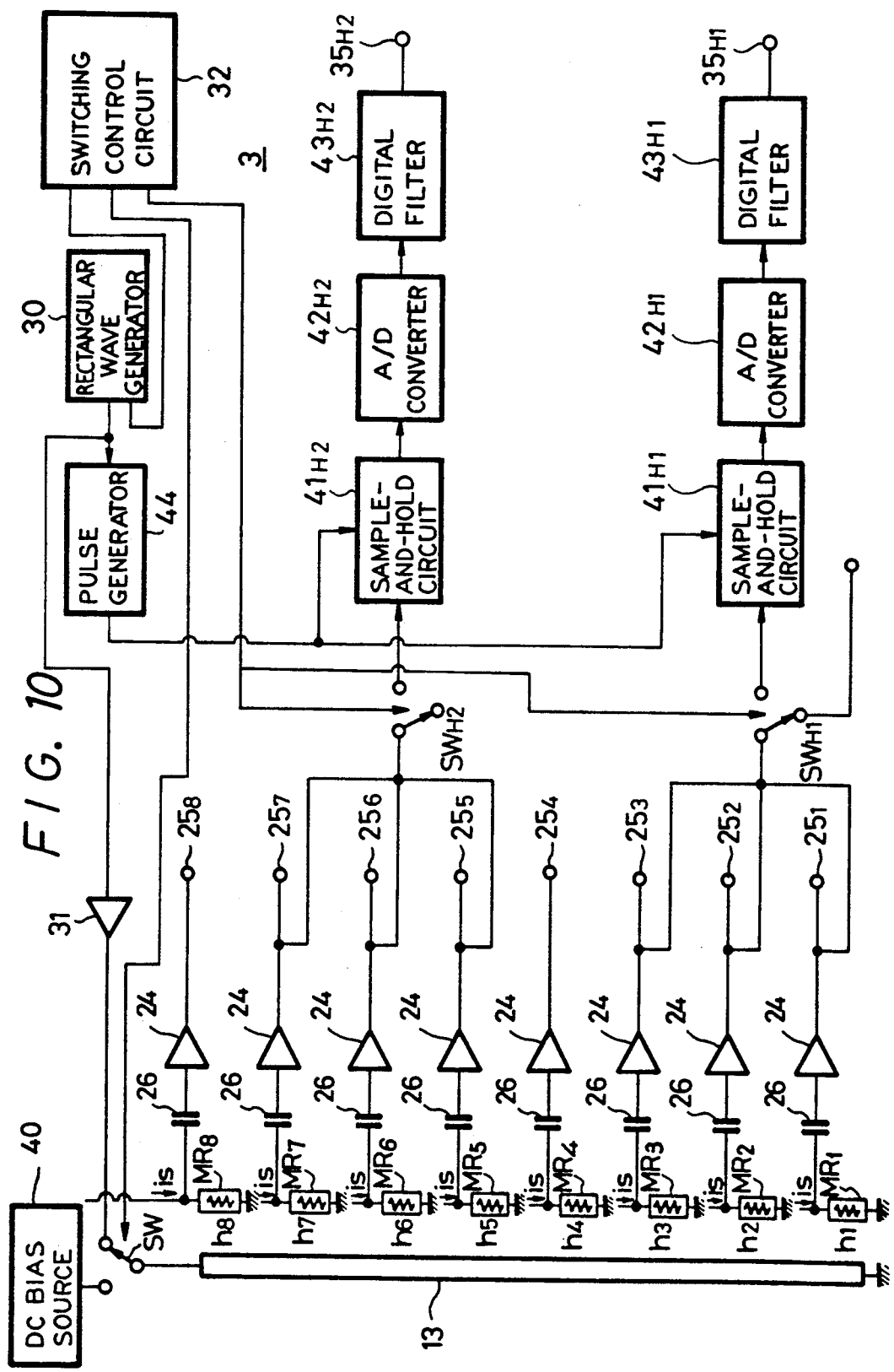
Figure 12:
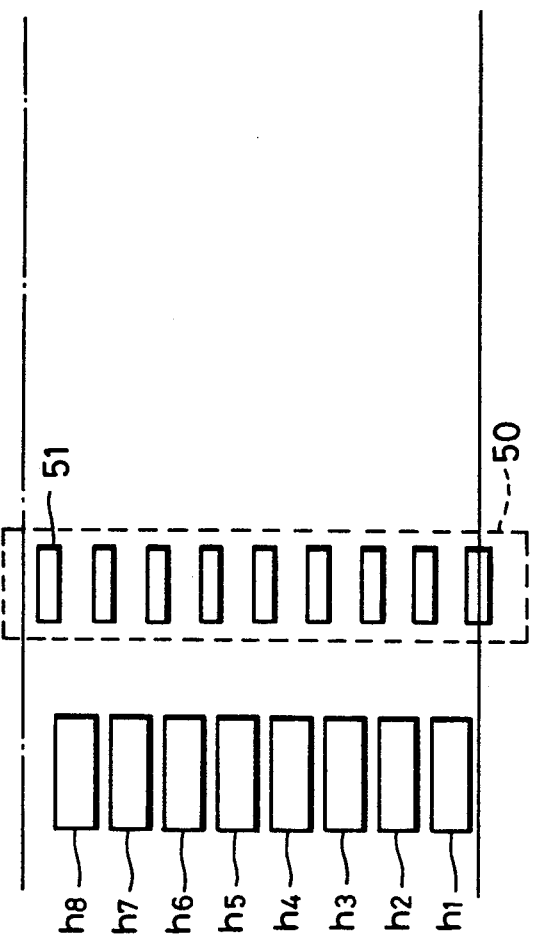
FIG. 12 shows the relationship between the erase head elements and the magnetic head elements.

Moreover, still another magnetoresistance effect magnetic head assembly is proposed as disclosed in Japanese Patent Laid-open Gazette No. 54005/1986 which this applicant filed. As shown in FIG. 10, the inverters $33H_1$ and $33H_2$ in FIG. 9 are replaced by sample-and-hold circuits $41H_1$ and $41H_2$ for sampling and holding the rectangular wave signal from the amplifiers 24, A/D converters $42H_1$ and $42H_2$ for converting the outputs of the sample-and-hold circuits $41H_1$ and $41H_2$, and digital filters $43H_1$ and $43H_2$, $43H_2$ to which the digital signals from the A/D converters $42H_1$ and $42H_2$ are supplied. Thus, the digital filters $43H_1$ and $43H_2$ can supply to the output terminals $35H_1$ and $35H_2$, smooth digital signals which are code-inverted at every other sample and correspond to the signal magnetic field. The sample pulse signal formed on the basis of the pulse signal from the pulse generator 44 is synchronized with the rectangular wave signal from the rectangular wave generator 30 so as to generate a pulse signal of twice the frequency, or $2f_C$. In FIG. 10, like elements corresponding to those in FIGS. 3 and 9 are identified by the same reference numerals. In this case, too the switching control circuit 32 for switching the analog reproduction mode and the digital reproduction mode controls, upon digital reproduction changes the switch SW to the DC power supply 40 side position, the rectangular wave generator 30 is stopped, and the switches $SW_{H1}$ and $SW_{H2}$ are opened. Thus, the outputs from the magnetic head elements $h_1$ to $h_8$ are produced from the output terminals 25 to $25_8$.

While in the examples, the magnetic head elements $h_1$ to $h_8$ are formed by the magnetoresistance effect magnetic head elements, they may be formed by an inductive type, for example, thin film type magnetic head.

Moreover, in the above system of this invention the analog recorded magnetic tape 1A is reproduced by part of the magnetic head elements $h_1$ to $h_8$, or sets of three magnetic head elements $h_1$ to $h_3$, $h_5$ to $h_7$ which oppose the tracks $T_{D1}$ to $T_{D8}$ of the digital recording magnetic tape. In practice, since the shortest wavelength to be recorded in digital form is 1 $\mu m$ or below, the gap length of the digital magnetic head elements is selected to be 0.3 to 0.4 $\mu m$, while the gap length of the analog magnetic head is preferably 0.8 to 1 $\mu m$ relative to the recorded wavelength. In the analog reproduction mode, since the digital magnetic head elements of small gap length are used and since a necessary distance is required between the elements $h_1$ to $h_3$ and between $h_5$ to $h_7$, the reproduction efficiency is low.

In order to solve this low reproduction efficiency problem, it is desired to use different magnetic head elements having gap length, characteristics and track widths suitable for the reproduction of each of the analog magnetic recording tape 1A and digital magnetic recording tape 1D.

According to another system of the invention, as shown in FIG. 5, the tape recorder has, in addition to the magnetic head elements $h_1$ to $h_8$ for digital reproduction, first and second magnetic head elements $H_1$ and $H_2$ for analog reproduction to oppose the first and second analog recorded magnetic tracks $T_{A1}$ and $T_{A2}$ of the analog recorded magnetic tape 1A. On the other hand, as shown in FIGS. 4A and 4B, the analog recorded magnetic tape 1A and digital recorded magnetic tape 1D of the tape cassettes 4A and 4D are provided, and the magnetic tapes 1A and 1D each have halves $1A_1$, $1D_1$ and other halves $1A_2$, $1D_2$ relative to the widthwise direction. The magnetic tapes 1A and 1D are used and transported in the arrow-a direction and arrow b direction so that the respective halves of the analog recorded magnetic tape 1A and digital record magnetic tape 1D are reproduced. When transported in one direction a, the analog recorded magnetic tape and the digital recorded magnetic tape have thereon the recorded areas, or one half $1A_1$ and the other half $1A_2$, respectively, and when transported in the other direction b, the analog recorded magnetic tape 1A and the digital recorded magnetic tape 1D have formed thereon the recorded areas, or the other half $1A_2$ and one half $1D_1$, or the so-called A-side and B-side, respectively.

As shown in FIG. 5, the analog reproducing magnetic head elements $H_1$, $H_2$ and digital reproducing magnetic head elements $h_1$ to $h_8$ s are opposed to the one half $1A_1$, $1D_1$ of the tape 1D, 1A when the analog recorded magnetic tape cassette 4A or the digital recorded magnetic tape cassette 4D is loaded in the tape recorder. When the tape is transported in the arrow a direction, for example the so-called A-side can be reproduced. In this case, when the cassette 4A is loaded so that the analog recorded magnetic tape 1A is reproduced, the magnetic head elements $H_1$ and $H_2$ are operated. When the cassette 4D is loaded so that the digital recorded magnetic tape 4A is reproduced, the magnetic head elements $h_1$ to $h_8$ are operated. In this case, the circuits associated with the magnetic head elements $h_1$ to $h_8$ or $H_1$, $H_2$ which are not required to operate, are not supplied with power for the purpose of power saving.

In this system, when the other half $1A_2$, $1D_2$ of the tape cassette 4A, 4D is reproduced, the cassette 4A, 4D is turned over and loaded, and the tape is travelled in the arrow b direction as shown in FIG. 4. For the so-called autoreverse operation, the magnetic head elements $H_1$, $H_2$ and $h_1$ to $h_8$ are inverted out.

Figure 11:
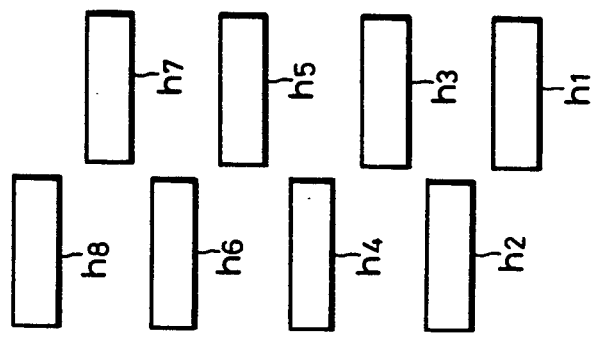
FIG. 11 is a diagram of the arrangement of magnetic head elements.

Moreover, the analog reproducing magnetic head elements $H_1$, $H_2$ and digital reproducing magnetic head elements $h_1$ to $h_8$ can be formed by a bulk-type inductive head. In this case, the head elements H and $H_2$ are spaced enough, as are the conventional magnetic heads, to reserve the space for the head winding. If a large number of very small magnetic head elements $h_1$ to $h_8$ are shifted in position at every other one relative to the tape travel so as to be in two rows as, for example shown in FIG. 11, the adjacent elements in each row can be spaced to oppose every other track, and thus to keep the winding space. In this case, the delay due to the positional shift of every other element can be corrected by digital signal processing and thus no problem occurs.

If erase head elements 51 of the so-called tunnel erase 50 are provided between the head elements $h_1$ to $h_8$ and on both the outer sides of the head elements group so as to make overwriting relative to the tracks $TD_1$ to $TD_8$, arbitrary overwriting can also be made on the cue signal track $TD_8$.

While in the above embodiment the magnetic head elements $h_1$ to $h_8$ are exclusively used for reproduction, they may be used for digital recording and reproduction, or other digital recorded head elements may be separately provided.

An embodiment of a tape cassette used in the invention will be described with reference to FIGS. 2, and 15 to 19.

FIG. 15 is a plan view of a tape cassette for exclusive use in the S-DAT, according to this embodiment.

This tape cassette A has the same specification and construction as the normal audio cassette, or compact cassette, and has provided therein a magnetic tape 102, reel hubs 103 which are rotated to wind and unwind the tape, and, though not shown, guide rollers, guide poles and a shield plate. The magnetic tape 102 wound on the reel hub 103 is transported through the guide rollers, guide poles, and shield plate past the head of a cassette recorder which will be described later.

The cassette recorder used here is, for example, of a stationary head system such as S-DAT and has the compatibility for the digital and analog recording/reproduction. Particularly in this embodiment, as shown in FIG. 2 it has 8 heads $h_1$ to $h_8$ including a cue head $h_8$ of which a plurality of heads (three heads in this illustration) are disposed to oppose an analog track $TA_1 TA_2$ of R-channel, L-channel. The hardware other than the heads are the same as the normal analog cassette system. When the magnetic tape 102 is recorded with a digital signal, the 7 heads $h_1$ to $h_7$ except the cue head $h_8$ are used to form 7 multiple tracks. When the compact tape recorded by the normal analog cassette system is reproduced, each of the three heads $h_5$ to $h_7$, $h_1$ to $h_3$ is used to read, or reproduce the analog track $TA_1$, $TA_2$ on R-channel, L-channel.

Figure 22A:
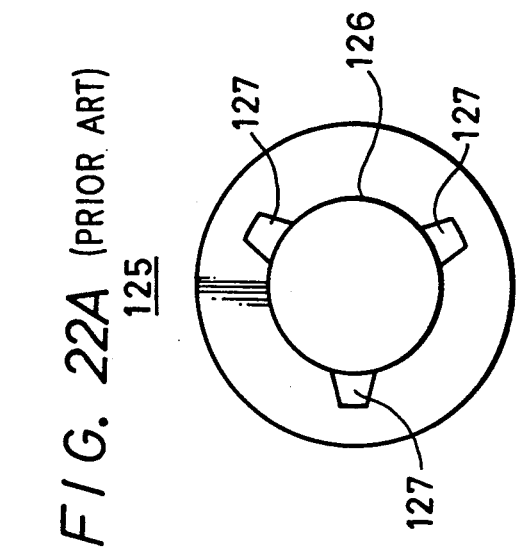
FIGS. 22A and 22B are a plan view and a side view of the normal reel table.
Figure 22B:
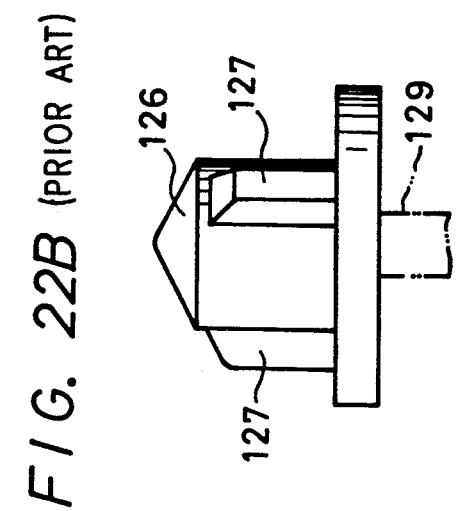
Figure 20:
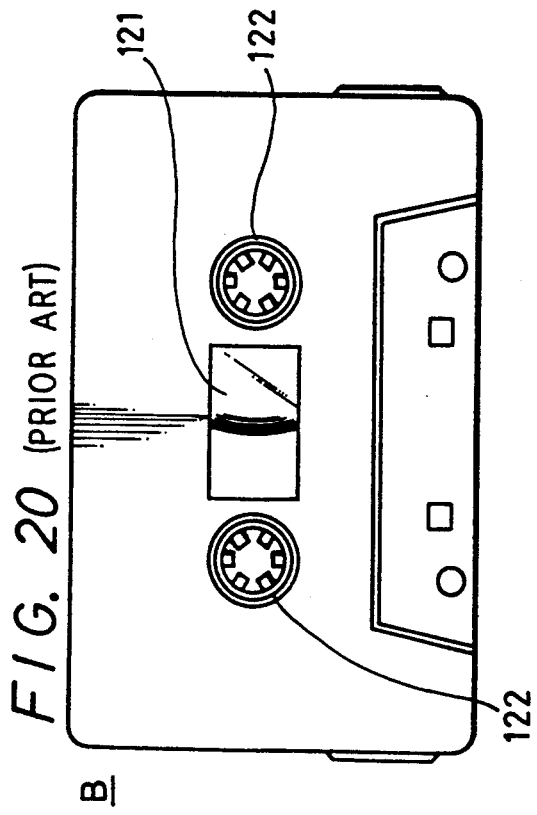
FIG. 20 is a plan view of a conventional compact cassette.
Figure 21:
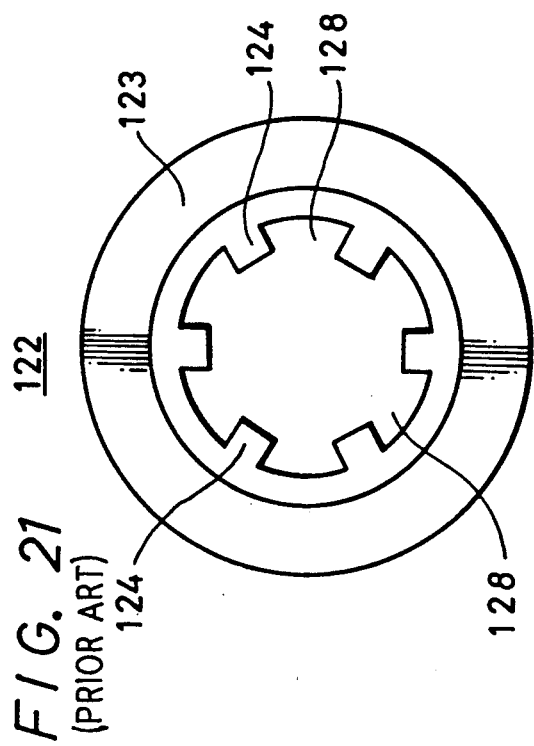
FIG. 21 is a plan view of the normal reel hub.

The reel hub 103, as shown in FIG. 16, has poles 105 integrally formed on a cylindrical body 104 to extend in the radial direction. The 6 poles 105 are arranged at an equal pitch as are the ratchets 124 in the normal reel hub 122 (see FIG. 21). And holes or cutouts 106 are provided at portions corresponding to the recesses 128 between the ratchets 124 of the normal reel hub 122. That is, the cutouts 106 are formed to oppose the engaging projections 127 around the reel shaft 126 of the normal reel table (see FIG. 22). The 6 poles 105 are connected at the center of the reel hub 103, and this connection portion 107, and the 6 poles 105, block the cassette not to be fitted with the reel shaft 126 of the normal reel table 125 (see FIG. 22).

Since the hub 103 concerned with this embodiment has the above construction, each of the reel tables 110 mounted on the S-DAT tape cassette holding portion used in this embodiment has, as shown in FIG. 17, a plurality of (3 in this figure) projections 112 provided to project from the upper surface of a base 111. The diameter of the projections 112 is smaller than the width of the openings of the cutouts 106 of the reel hub 103. The projections 112 are so arranged that when the tape cassette A is loaded on the tape cassette holding portion of the S-DAT, or when the reel hubs 103 are engaged on the reel tables 110, the three projections 112 are equidistantly inserted in three one of the 6 cutouts 106 of each of the reel hubs 103 as shown in FIG. 16 by the two-dot chain lines. Particularly in this embodiment, each of the three projections can also be inserted in the recesses 128 of the normal reel hub 122 (see FIG. 21). When the reel table 110 is rotated by the rotating shaft 113, the projections 112 and the poles 105 are engaged and the reel hub 103 is rotated. Thus, the magnetic tape 102 wound on the reel hubs 103 is continuously transported past the head as the reel hubs 103 are rotated, so that digital or analog recording/reproduction can be made.

According to this embodiment as described above, since the tape cassette A is constructed so that particularly in the reel hubs 103, the cutouts 106 are provided at the positions corresponding to the engaging projections 127 which are provided around the reel shaft 126 of the normal reel table 125 (see FIG. 22) and that the six poles 105 and the connection portion 107 are provided to block the reel shaft 126 not to engage, this cassette can be prevented from being loaded to the reel table 125 of the normal analog cassette system. Thus, the S-DAT tape cassette A can be prevented from being misloaded in the normal analog cassette, and the general user can easily understand that the S-DAT tape cassette A cannot be used on the normal analog cassette system, thus not getting confused upon using the tape cassettes (the S-DAT tape cassette and the conventional compact cassette). Moreover, the general user can understand the idea of the compatibility, or that the S-DAT has the compatibility for the digital and analog recording/reproduction, whereas the normal analog cassette system does not have the compatibility for the digital recording/reproduction. Thus, the S-DAT is promoted for wide use. Particularly, since the reel hubs 103 of this embodiment each have 6 poles 105 extended to the center of the reel hub 103 unlike the reel hub of the conventional compact cassette, the S-DAT cassette can be distinguished at a glance from the normal compact cassette.

Moreover, since the reel table 110 concerned with this embodiment has three projections 112 provided equidistantly for each hub on the base 111, the reel hubs 103 of this embodiment can be engaged with the projections, or the projections can be inserted in the cutouts 106 of each of the reel hubs 103, and the reel hubs 122 of the conventional compact cassette B (see FIG. 21) can be engaged with the projections, or the projections can be inserted in the recesses 128. Therefore the S-DAT associated with this embodiment, and having this reel table 110 can accept not only the S-DAT tape cassette but also the conventional compact cassette. If the tape stopper of the cassette case within which the tape cassette is placed for preservation and management is constructed in the same way as the reel table 110, the S-DAT tape cassette and the conventional compact cassette can be separately preserved and managed while being distinguished from each other.

Figure 18:
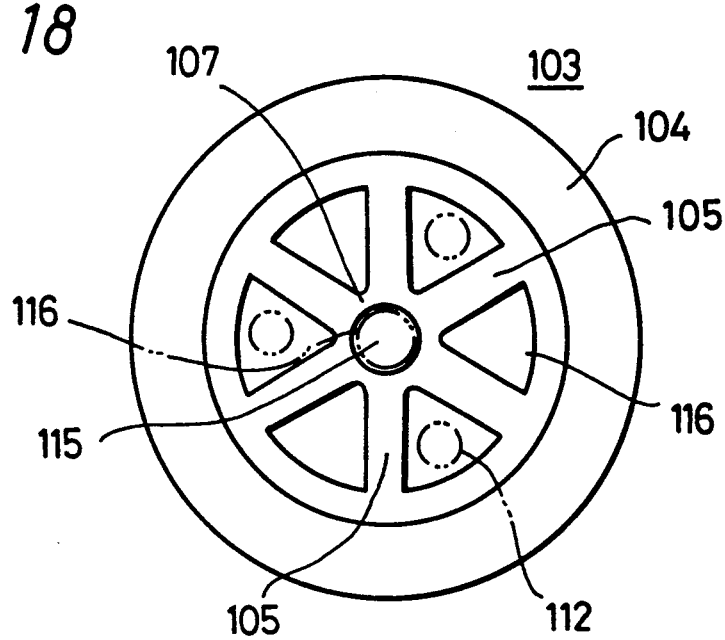
FIG. 18 is a plan view of another example of the reel hub.
Figure 19A:
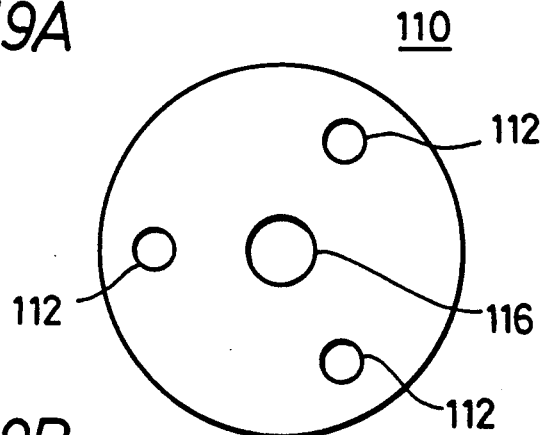
FIGS. 19A and 19B are a plan view and side view of another example of the reel table.
Figure 19B:
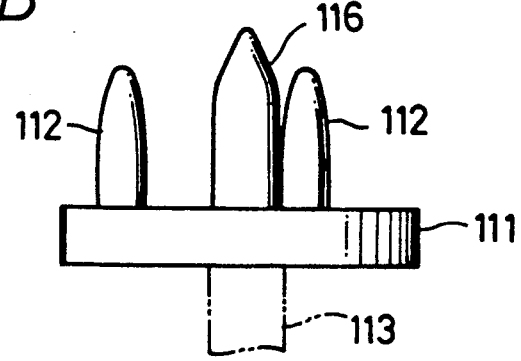

Also, if, as shown in FIG. 18, an insertion hole 115 is further provided at the connection portion 107 or at the center of the reel hub 103 where the six poles 105 are connected together, and if, as shown in FIG. 19, a projection 116 to be inserted in the insertion hole 115 is provided at the center of base 111 of each of the reel tables 110, the reel hubs 103 can be more effectively stabilized on the reel tables 110.

While three projections 112 are provided on the base 111 of each of the reel tables, a single projection may be provided, or two, four, five or six projections may arbitrarily be provided, considering the stability of the reel hubs 103 on the reel tables.

Since each system of this invention can reproduce the analog and digital recorded magnetic tapes compatibly, it can be applied to a digital tape recorder capable of reproducing the generally used compact cassette, particularly to a portable, pocket-size tape recorder, and has great advantages.

Further according to the tape cassette of this invention, the reel hubs each have cutouts provided to oppose the engaging projections of each of the normal reel table. The reel table has a reel shaft at its center and engaging projections integrally provided around the reel shaft. Blocking portions for blocking the reel shaft from being inserted in the cutouts are provided. This tape cassette can be prevented from being loaded in the normal analog cassette system, so that a recorder of the type which has compatibility for digital and analog recording/reproduction (for example, S-DAT) and the other type having no compatibility (the normal analog cassette system) can be selected for this tape cassette without confusion. Moreover, the general user can easily understand the idea of the compatibility.

Although various minor changes and modifications might be proposed by those skilled in the art, it will be understood that we wish to include within the claims of the patent warranted hereon all such changes and modifications as reasonably come within our contribution to the art.

We claim as our invention:

1. An analog/digital compatible reproducing head system for use with either a digital recorded magnetic tape having a plurality of digital data recorded tracks or an analog recorded magnetic tape having first and second analog recorded tracks with a guard band therebetween of given width, comprising:

a magnetic head element for each of the digital data recorded tracks, each of said magnetic head elements being positioned for alignment with each respective digital data recorded tracks;

first means for providing a first combined output of a first group of some of said magnetic head elements which are positioned for alignment with said first analog recorded track of said analog recorded magnetic tape;

second means for providing a second combined output of a second group of other of said magnetic head elements which are positioned for alignment with said second analog recorded track of said analog recorded magnetic tape; and switching means for inhibiting use of the first and second outputs when a digital recorded magnetic tape is being reproduced and for utilizing said first and second combined outputs when said analog recorded magnetic tape is being reproduced.

2. A system according to claim 1 wherein said first means comprises outputs of at least two magnetic head elements being connected together and said second means comprises outputs of at least two other magnetic head elements being connected together.

3. A system according to claim 2 wherein the first means comprises a connection together of three magnetic head element outputs and the second means comprises a connection together of three other magnetic head element outputs.

4. A system according to claim 1 wherein the first and second groups each comprise at least two head elements and wherein at least one additional head elements is positioned adjacent said guard band between the two groups.

5. A system according to claim 1 wherein said switching means further includes a switchable bias means for connecting a bias line for the magnetic head elements to an AC supply position when reproducing from said analog recorded magnetic tape, and to a DC bias position when reproducing from said digital data recorded magnetic tape.

6. A system according to claim 5 wherein said DC bias position connects to a DC bias source and said AC supply position connects to a rectangular wave generator.

7. A system according to claim 1 wherein when reproducing from said analog recorded magnetic tape, said switching means connects the first and second group outputs to respective first and second multipliers which are themselves connected at their outputs to respective first and second low pass filters.

8. A system according to claim 7 wherein said multipliers connect to a rectangular wave generator.

9. A system according to claim 1 wherein said switching means, when reproducing said analog recorded magnetic tape, connects the first and second group outputs to respective first and second low pass filters.

10. A system according to claim 1 wherein when reproducing said analog recorded magnetic tape, said switching means connects said first and second group outputs to respective first and second sample-and-hold circuits, said first and second-and-hold circuits being connected at their outputs to respective A/D converters, and said converters being connected at their outputs to respective following digital filters.

11. A system according to claim 1 wherein said magnetic head elements comprise magneto-resistance effect magnetic head elements comprise magneto-resistance effect magnetic heads, and wherein said switching means includes means for applying a high frequency bias magnetic field to magneto-sensitive portions of said magneto-resistance heads when reproducing said analog recorded magnetic tape and for applying a DC bias magnetic field to said magneto-sensitive portions when reproducing said digital recorded magnetic tape.

12. An analog/digital compatible reproducing head system for use with either a digital recorded magnetic tape having a plurality of digital data recorded tracks or an analog recorded magnetic tape having first and second analog recorded tracks, comprising:

a single magnetic head element only for each of the digital data recorded tracks, each of said magnetic head elements being positioned for alignment with each respective digital data recorded track;

first means for providing a first combined output of a first group of some of said magnetic head elements which are positioned alignment with said first analog recorded track of said analog recorded magnetic tape;

second means for providing a second combined output of a second group of other of said magnetic head elements which are positioned for alignment with said second analog recorded tracks of said analog recorded magnetic tape; and switching means for inhibiting use of the first and second outputs when a digital recorded magnetic tape is being reproduced and for utilizing said first and second combined outputs when said analog recorded magnetic tape is being reproduced.

* * * * *